US012789432B2

(12) United States Patent
Biscaro et al.

(10) Patent No.: US 12,789,432 B2
(45) Date of Patent: Nov. 10, 2026

(54) METHOD AND COMPONENT OF A HOT-INJECTION APPARATUS

(71) Applicant: INGLASS S.P.A., San Polo di Piave (IT)

(72) Inventors: Enrico Biscaro, San Polo di Piave (IT); Claudio Dall'Acqua, San Polo di Piave (IT); Massimo Bisetto, San Polo di Piave (IT)

(73) Assignee: INGLASS S.P.A., San Polo di Piave (IT)

( * ) Notice: Subject to any disclaimer, the term of this patent is extended or adjusted under 35 U.S.C. 154(b) by 40 days.

(21) Appl. No.: 18/793,985

(22) Filed: Aug. 5, 2024

(65) Prior Publication Data

US 2025/0050565 A1 Feb. 13, 2025

(30) Foreign Application Priority Data

Aug. 10, 2023 (IT) ........................ 102023000017169

(51) Int. Cl.
*B29C 45/58* (2006.01)
*B29C 45/28* (2006.01)

(52) U.S. Cl.
CPC ........ *B29C 45/581* (2013.01); *B29C 45/2806* (2013.01); *B29C 2045/2889* (2013.01)

(58) Field of Classification Search
CPC ...................... B29C 45/581; B29C 2045/2889
See application file for complete search history.

(56) References Cited

U.S. PATENT DOCUMENTS 4,932,858 A * 6/1990 Gellert ................ B29C 45/2725 425/572
4,938,681 A * 7/1990 Gellert ................ B29C 45/2806 425/549
5,284,429 A * 2/1994 Schneider ........... B29C 45/1736 264/572
7,618,253 B2 * 11/2009 Ten ..................... B29C 45/2725 425/572
9,421,705 B2 * 8/2016 Rossi ...................... B29C 45/18
(Continued)

FOREIGN PATENT DOCUMENTS

CN 102069573 A 5/2011
EP 0264725 A2 4/1988
(Continued)

*Primary Examiner* — Seyed Masoud Malekzadeh
(74) *Attorney, Agent, or Firm* — Rivka Friedman

(57) ABSTRACT

A component is described for an injection molding apparatus. The component is mounted within a manifold as a junction between a supply channel, which has a first axis, and an injection channel, which has a second axis and leads to an injection nozzle for injection towards a mold cavity. A nozzle shutter crosses the feed channel and the component along the second axis. The component comprises an outer surface comprising inlets adapted to receive the molten material arriving from the supply channel, a central cavity which is in fluid communication with the injection channel to send the molten material there, and internal channels which cross the thickness of the component. The terminal section of each internal channel in proximity of the respective outlet develops so as to introduce the molten material into the central cavity according to an introduction direction directed towards the injection channel.

20 Claims, 7 Drawing Sheets

(56) References Cited

U.S. PATENT DOCUMENTS

| | | | | |
|---|---|---|---|---|
| 11,752,675 | B2 * | 9/2023 | Rossi | B29C 45/281 425/564 |
| 12,179,401 | B2 * | 12/2024 | Rossi | B29C 45/281 |
| 2006/0082031 | A1 * | 4/2006 | Dewar | B29C 45/2711 264/328.8 |
| 2008/0031997 | A1 * | 2/2008 | Bazzo | B29C 45/2806 425/562 |
| 2014/0103578 | A1 * | 4/2014 | Rossi | B29C 45/18 264/328.17 |
| 2015/0197049 | A1 * | 7/2015 | Olaru | B29C 45/2735 277/300 |
| 2022/0143885 | A1 * | 5/2022 | Rossi | B29C 45/281 |
| 2023/0373141 | A1 * | 11/2023 | Rossi | B29C 45/281 |

FOREIGN PATENT DOCUMENTS

| | | | |
|---|---|---|---|
| EP | 0405007 | A2 | 1/1991 |
| WO | 2008061585 | A1 | 5/2008 |
| WO | 2009049419 | A1 | 4/2009 |
| WO | 2016131130 | A1 | 8/2016 |

* cited by examiner

METHOD AND COMPONENT OF A HOT-INJECTION APPARATUS

TECHNICAL FIELD

The present invention relates to an injection molding method, a component of an injection molding apparatus, and the apparatus comprising the component.

BACKGROUND

It is known for example from WO2021198950A1 the problem of the differential or speed gradient that establishes in the molten material when it passes from the supply channel (CA) to the injection channel (CI), see page 2 lines 3-27. Basically, in the connecting section between the CA and the CI, the flow arriving from the CA collides with the shutter and is forced to follow two paths: one, direct, along the "front" of the shutter and the other on the "back" of the shutter. The paths have different geometry, therefore different pressure losses and consequently different advancement speeds along the CI.

The portion of the flow that impacts the shutter and turning goes down along the CI on the shutter front suffers a lower pressure drop, therefore it is faster. The portion of flow that impacts the shutter and goes around it is therefore subjected to a greater pressure drop. Consequently it is slowed down and is forced to travel a longer distance (a greater load loss is due to the circumvention of the shutter).

Since the fluid on the back of the shutter is slower, areas of material stagnation are created there. The material stagnates for multiple molding cycles, which generates defects on the molded parts when the color of the injected polymer is changed.

Since the waste pieces may be very numerous (dozens and dozens) with consequent waste of material, energy and time, punctual and fast cleaning of the CI is necessary to limit pollution of the molded piece caused by residues of the previous material.

SUMMARY

The main object of the invention, defined in the independent claims, is to improve this state of the art.

Another object is to make a component of an injection molding apparatus that reduces the stagnation zones of the molten material, which for example is a polymer.

Another object of the invention is to improve molding efficiency, in particular by reducing the number of molding operations necessary to carry out the color change in injection molding systems.

A further object is to uniform the velocity and thermal field of the flow of the molten material inside the injector, therefore guaranteeing greater radial uniformity at the exit of the gate or injector.

The dependent claims define advantageous variants of the invention.

The invention concerns a component, of an injection molding apparatus, configured to be mounted inside a collector of molten material as a junction between a supply channel, which has a first axis, and an injection channel, which has a second axis and leads to a nozzle for injection towards a mold cavity, wherein a shutter of the nozzle passes through the injection channel and the component along the second axis, the supply channel and the injection channel are made inside a collector (manifold) of the apparatus, the first axis and the second axis are substantially incident and form an angle of direction change for the molten material, the component comprising:

an external surface comprising inlets adapted to receive the molten material arriving from the supply channel, a central cavity which fluidly communicates with the injection channel to send the molten material there, inner channels that cross the thickness of the component and are adapted to put said inlets into communication with P outlets in the central cavity through P terminal sections of the channel, P>=3, wherein the terminal section of each inner channel in proximity of the respective outlet develops so as to introduce the molten material into the central cavity according to an introduction direction directed towards the injection channel, wherein the introduction directions of the P terminal sections:

are contained in a reference plane (see for example FIG. 18) passing through a third axis parallel to the second axis (and preferably coinciding with the third axis), are arranged circularly around the third axis, and form an introduction angle $0<\alpha<90°$ with respect to a plane orthogonal to the third axis.

The component of the invention is mounted inside the junction section.

In general, the component serves to receive the flow of molten material arriving from the supply channel and divert it into the injection channel. For this purpose, a part of the lateral surface of the component faces the supply channel and is hit by the flow of molten material, and the component internally comprises channels that cross its thickness and are directed towards a central cavity that communicates with the injection channel.

These inner channels have a development such as to make the flow of material they carry converge towards the central cavity, in particular so as to make it converge towards the second axis, more particularly to make it converge towards a common point of the axis. The flow of molten material in the supply channel is then divided by the component into sub-flows for each channel, the sub-flows are diverted/directed by the component towards the injection channel, and upon exiting the component they recompose the initial flow. The inner channels cause the sub-flows to flow into the central cavity with a certain introduction direction.

The introduction directions may be converging towards the third axis (angle $\alpha$ is acute), or parallel to the third axis. In particular, the introduction directions all form the same angle $\alpha$; or two or more introduction directions may form different angles $\alpha$.

The number P of outlets affects the stagnation zones where the inner channels flow into because a stagnation zone is formed between the P outlets (between two outlets there is an area in which the material does not flow or flows with reduced speed, therefore they are zones of stagnation). The greater the number P of outlets, the smaller the stagnation zones between them. Experimentally the Applicant discovered that with at least P=3 terminal sections and P=3 outlets the stagnation areas become small enough to give a negligible negative contribution.

By increasing the number P of terminal sections and outlets, the stagnation zones become smaller, decreasing the bearing of the molten material residues.

The outlets may have a circular or elliptical, oval, polygonal or bean-shaped cross-section, more or less elongated.

In a more preferred geometry variant, the reference planes containing the introduction directions all pass through the third axis.

In a variant, the angular pitch β between one reference plane and the next one is equal and constant for all pairs of reference planes; in a different variant the angle β may be different from pair to pair of reference planes.

In particular, the introduction directions are arranged like the edges of an imaginary right pyramid having base polygon with as many sides as the P terminal sections, vertex on the third axis and facing the central cavity, and altitude coinciding with the third axis.

For the above, said base polygon may be regular or not.

In a preferred variant, the component comprises P inner channels configured to connect each inlet only with a respective terminal section (the inner channels may also have different lengths). This entails the making of independent and separate inner channels, allowing a simpler estimate, and therefore better balancing and greater control, of the load losses in each portion of the inner channel.

Where it is difficult to build a component with many independent inner channels, as a preferred variant the component comprises:

R inlets on its external surface, R>=2,

R channel sections, wherein each of the R channel sections originates respectively from one of the R inlets, penetrates inside the component, and downstream branches off into Q terminal channel sections;

where Q>=2 and R*Q=P.

Thus the structure of the outermost part of the component is simplified.

Experimentally, a good compromise between structural complexity and fluid dynamic performance was obtained when Q=2, i.e. the component comprises R inlets on the external surface, each inlet leading to a channel section that bifurcates into two terminal parts, i.e. P=2*R.

In a preferred variant, the component has as its external surface substantially the lateral external surface of a cylinder.

In a preferred variant, which makes good use of the space available on the component, the latter comprises on said external surface one or more grooves configured to convey molten material to at least one of said inlets, preferably all. Through any of said grooves the molten material can be efficiently brought from one part of the component to another.

In a more preferred variant, effective for relaying the molten material on the component, one or each groove branches off into at least two branches configured to convey molten material in different, preferably opposite, directions from a point of the groove common to the branches towards at least two of said inlets.

More specifically, said branches of one or each groove extend along two arcs substantially contained in a plane orthogonal to the third axis, namely along an imaginary equatorial line. The two arcs might also lie in a plane not orthogonal to the third axis.

In a more preferred variant of construction geometry, one or each groove has a curved trend such as to determine at least an elbow-shaped change of direction for the conveyed molten material. In particular, said change of direction causes the molten material to flow from a direction along an equatorial line towards a direction parallel to the third axis. More particularly, one or each groove comprises a section that joins a first groove portion that extends along a first equatorial line and a second groove portion that extends along a second equatorial line, the first and second portions intersecting respectively two planes which are parallel to each other and offset (the first equatorial line being parallel and axially offset along the third axis with respect to the second equatorial line).

In a more preferred variant, of advantageous symmetry, such common point is an intermediate point of one or each groove, configured to receive molten material arriving from a section of groove and relay it along subsequent branches of the groove.

In a preferred variant, said common point is a receiving zone for molten material adapted to receive molten material directly from the supply channel and relay it along branches of the groove exiting from the receiving zone.

The component may have only one molten material receiving zone or more than one. In the first case all the groove branches originate from the receiving area; in the second case the receiving zones may be communicating with each other, via a section of groove or inner channel, or disjoint (separate and not communicating). If they are disjoint, each will supply one or more channels independently of the others.

In a preferred variant, the cross-section of the groove at the receiving area is wider than the cross-section of the groove at said branches.

In a preferred variant, the cross-sections of the inner channels are not all equal, but vary according to the position of the inner channel. In particular, the channels further away from the receiving area have a larger cross-section, to compensate for the load losses of a longer path.

In a more preferred variant, one or each groove has a polarly symmetrical trend around the third axis.

In a preferred variant, the component is provided with P=2*N terminal sections, N>=2, i.e. P is an even number. An even number of outlets simplifies the construction of the inner channels of the component and favors the symmetries of the flow inside it, which is important for having the same pressure drops in all the inner channels and consequently in the injection channel.

In a more preferred variant, the component comprises P=2*N distinct inlets, which are fed with molten material via:

2*N distinct and disjoint grooves, or two distinct and disjoint grooves that bifurcate N times to reach the 2*N inlets.

In a preferred variant, the terminal sections are straight channel sections or curved channel sections, to facilitate construction.

In a preferred variant, the section of inner channel between one of said inlets on the external surface and the origin of a terminal section is straight or curved. The straight sections of internal channel in general are easier to make, e.g. through drilling, while the curved sections have less pressure loss.

In a more preferred variant, the channels inside the body of the component, and/or the inlets provided on its external surface, may have different diameters from each other, to balance the pressure losses with respect to their length or width.

In a preferred variant, the angle of direction change is substantially right.

Preferably, said inlets and/or inner channels are holes of 4-7 mm in diameter, for ease of construction.

In a preferred variant, a portion of said one or each groove that leads to an inlet, or to an inner channel, tapers, with the advantage of pushing the molten material and causing it to accelerate thereby increasing its action of washing the molten material in the stagnation areas.

In this variant, the cross-section of the terminal sections furthest from the receiving area is greater than the cross-section of the terminal sections closest to the receiving area, to compensate for the pressure losses of the longer paths of molten material.

N, P, R, Q are positive integers.

Another aspect of the invention is an injection molding apparatus, comprising:

- an aforementioned collector of molten material provided with a joining section between a supply channel and the initial part of an injection channel,
- the aforementioned component,
- an injection nozzle at the end of the injection channel, and
- a nozzle shutter mounted to cross the injection channel and the component.

Normally, an injector completes the injection channel toward the nozzle.

Another aspect of the invention is a method for producing a component as defined above, wherein said inner channels for molten material and/or said terminal parts and/or said one or more grooves are made by milling a metal body of the component, or through 3D printing, or SLM or DMLS technology, or EBM (Electron Beam Melting), DED (Direct Energy Deposition), or even ADAM (Atomic Diffusion Additive Manufacturing), or powder metallurgy with sintering and/or HIP (Hot Isostatic Pressing).

The invention can be used in cold runner or hot runner systems.

BRIEF DESCRIPTION OF THE DRAWINGS

Further features and advantages of the invention will be more evident from the following description of preferred embodiments of a component, wherein.

Figure 4:
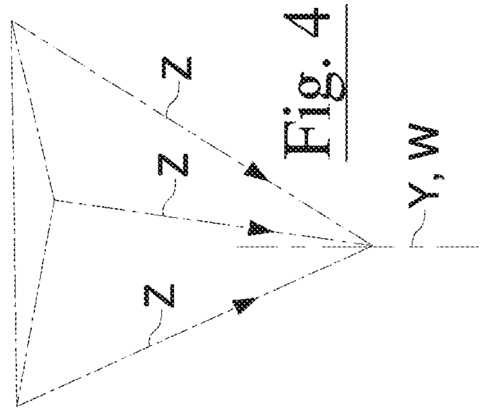
FIGS. 2-4 show diagrams for directions of fluid introduction.

In the drawings the arrows indicate flow direction of molten material.

In the figures equal elements are indicated by equal numbers, and in order not to crowd the drawings sometimes only some numbers are shown.

DETAILED DESCRIPTION

Figure 1:
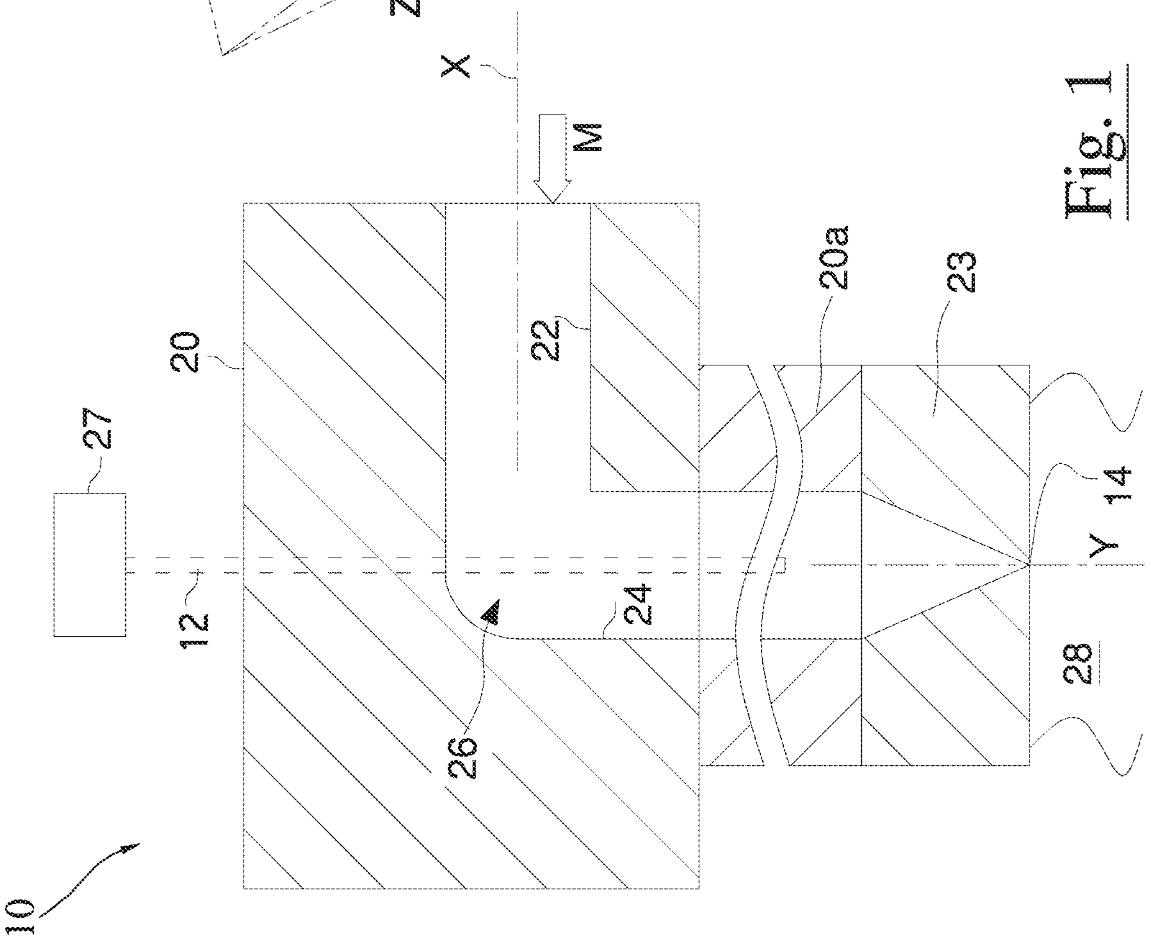
FIG. 1 shows an application diagram of the component.
Figure 7:
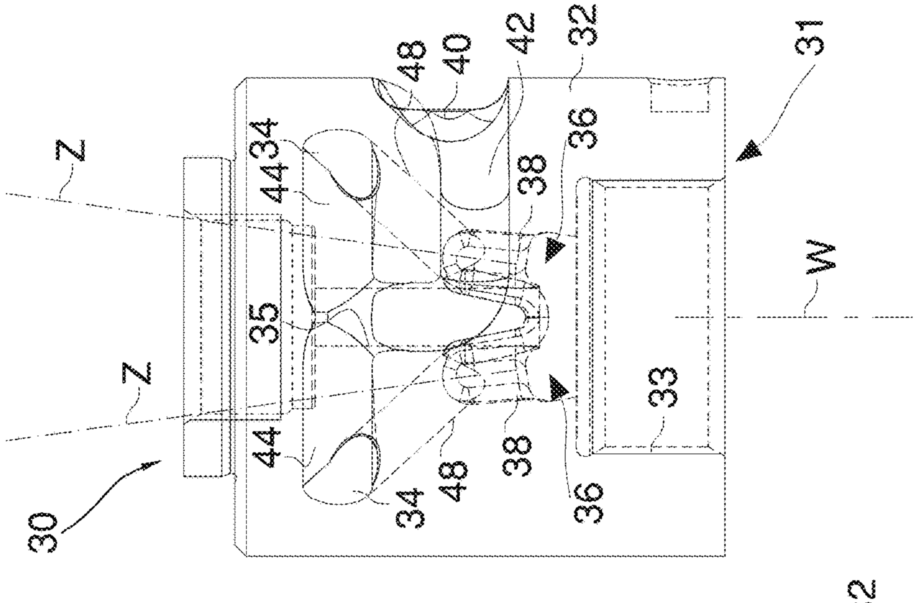
FIG. 7 shows a side view of the first component with internal parts shown with hatching.

FIG. 1 shows the application context of the component according to the invention.

FIG. 1 shows a very general diagram of an injection molding apparatus 10 which comprises a collector 20 (manifold or hot runner), internally provided with one or more supply channels 22, with X axis, inside which molten plastic material (indicated by an arrow M) is pushed by a press.

Each supply channel 22 joins to the initial part of an injection channel 24 via a joining channel 26.

In particular, the initial part of the injection channel 24 is made to extend into an injector 20*a* fixed to the collector 20. The opposite end of the injection channel 24 may comprise suitable nozzle tips 23.

For simplicity, only two channels of the collector 20 are illustrated in the Figures.

The injection channel 24, with Y axis, is crossed coaxially by a known shutter 12 (shown only schematically), used to open or close an injection nozzle 14 provided at the end of the injection channel 24. The shutter 12 can be moved by a known actuator 27 from an open position of the nozzle 14 to a closed position of the nozzle 14, and vice versa, in order to regulate the flow of material towards a cavity 28 of the mold.

In the example shown the X axis and the Y axis are essentially incident and form a right angle, but not necessarily.

The component of the invention is mounted inside the joining section 26.

In general, the component serves to receive the flow of molten material arriving from the supply channel 22 and divert it into the injection channel 24 efficiently and without stagnation. For this aim:

- a part of the lateral surface of the component faces the supply channel 22 and is hit by the flow of molten material, and
- the component internally comprises channels that cross its thickness and head towards a central cavity that communicates with the injection channel 24.

These inner channels have a development such as to make the flow of material they carry converge towards the central cavity, in particular so as to make it converge towards the second Y axis, more in particular to make it converge towards a common point of the Y axis. The flow of molten material in the supply channel 22 is then divided by the component into sub-flows for each channel, the sub-flows are diverted/directed by the component towards the injection channel 24, and exiting the component they recompose the initial flow. The inner channels cause the sub-flows to flow into the central cavity with a certain introduction direction Z.

Figure 18:
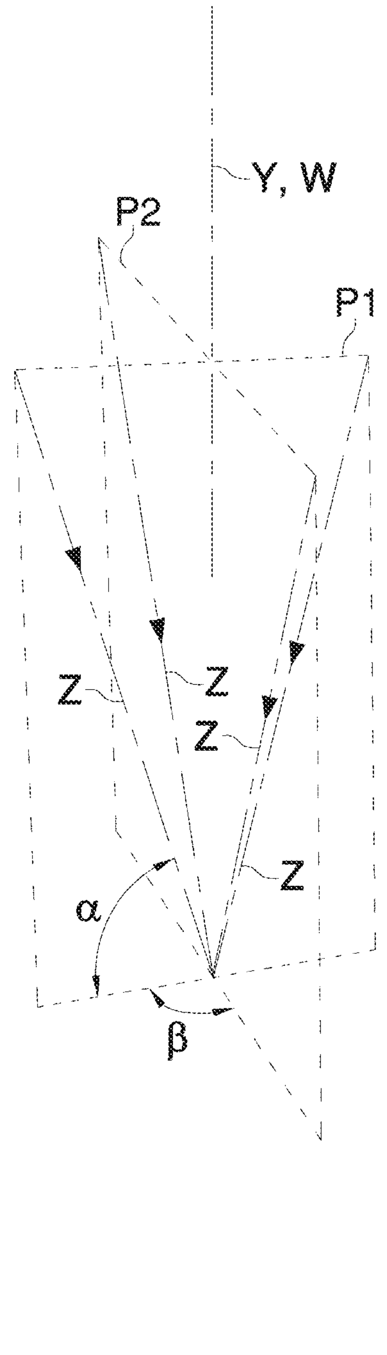
FIG. 18 shows a general scheme for directions of fluid introduction.

FIG. 18 shows as an example a general scheme for introduction directions Z, induced by the inner channels, which are convergent towards a third W axis which is parallel or coincident with the Y axis.

The various introduction directions Z are arranged circularly around the third W axis and are each contained in a reference plane passing through the third W axis.

For graphic simplicity FIG. 18 shows only two reference planes P1, P2, it being understood that each introduction direction Z lies on an independent reference plane.

Each introduction direction Z forms its own acute introduction angle $\alpha$ with respect to a plane orthogonal to the reference planes. The angle $\alpha$ may be different for each introduction direction Z, but preferably is the same for all introduction directions Z.

The introduction directions Z, always remaining contained in the reference planes P1, P2, may also be parallel to the third axis W (angle $\alpha$ is right).

Each pair of consecutive reference planes in the circular sequence of planes forms an angle $\beta$. Such angle $\beta$ may be different for each pair of consecutive reference planes. Preferably the angle $\beta$ between each pair of consecutive reference planes is equal, for greater symmetry.

Figure 3:
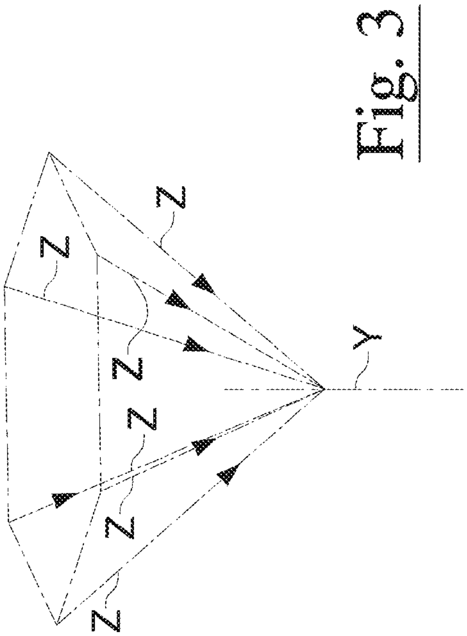
Figure 2:
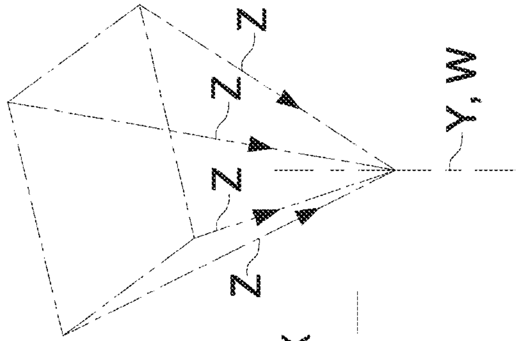

FIGS. 2-4 show other examples of orientation for some introduction directions Z for the terminal sections of the inner channels in some variants of the component where the angle $\alpha$ is acute.

The introduction directions Z are arranged around the Y, W axis like the edges of an imaginary right pyramid whose base polygon may or may not be regular. In the first case the introduction axes Z have the same angle $\alpha$ and polar symmetry with respect to the Y, W axis; in the second case, not so.

The angle $\alpha$ of an introduction direction Z is a variable parameter, which can be optimized to compensate for the pressure loss of that channel and equalize it for all channels. The same applies to the altitude of the aforementioned pyramid and the angle $\beta$.

In FIG. 2 P=4 and $\beta$=90°; in FIG. 3 P=6 and $\beta$=60°; in FIG. 4 P=3 and $\beta$=120°.

In general, for introduction directions Z with polar symmetry about the Y, W axis we have $\beta$=360°/P.

As already mentioned, $\beta$ may be constant for all pairs of adjacent introduction directions Z, or not.

A first preferred embodiment of the component is the component 30 of FIG. 5-9, which has a substantially cylindrical shape, but not necessarily, with the W axis preferably coinciding with the Y axis and an external lateral surface 32.

The component 30 represents a good compromise between structural complexity and fluid dynamic performance.

The component 30 has a base 31 having a central cavity 33 which communicates fluidly with the injection channel 24.

In the surface 32 there are obtained four inlets 34 for the molten material, which continue into the body of the component 30 to put each inlet 34 into communication with a respective outlet 36 which flows into the central cavity 33.

Each inner channel ends in the central cavity 33 with a terminal section 38, and the terminal sections 38 are straight and extend along an introduction direction Z. These Z directions are arranged like the edges of an imaginary pyramid with a square base which has vertex on the second Y axis and facing the central cavity, and altitude parallel to the second Y axis.

See also the diagram in FIG. 2.

By geometry, then, the terminal sections 38 have the outlets arranged with polar symmetry about the second Y axis, and the introduction directions intersect the W axis and the Y axis at a common point.

In this variant, the component 30 comprises a single front receiving zone 40 for the molten material arriving from the supply channel 22. The receiving zone 40 feeds with molten material two primary branches 42, which extend in opposite directions and each of which then bifurcates into two secondary branches 44 which extend in opposite directions.

The primary branches 42 and/or the secondary branches 44 are preferably grooves cut into the surface 32, but may be closed channels obtained in the body or cylinder of the component 30.

Figure 6:
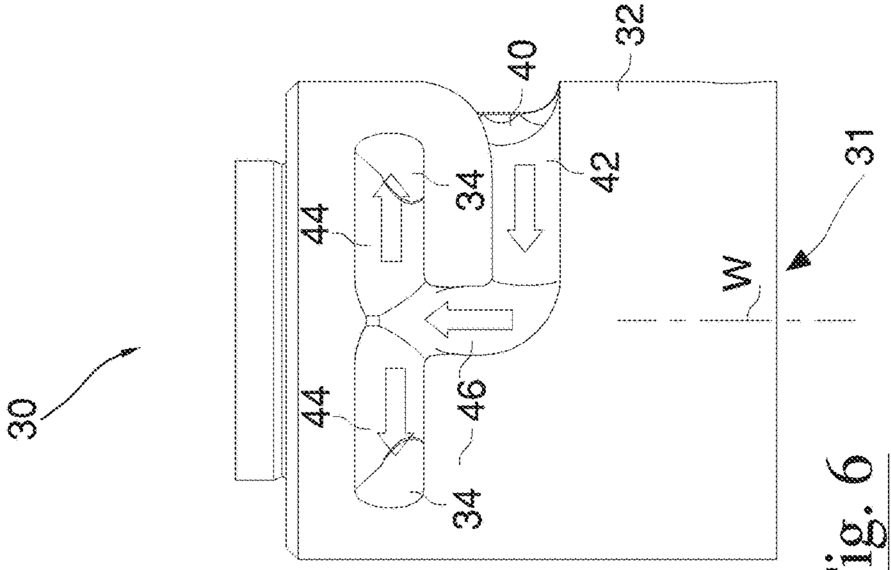
FIG. 6 shows a side view of the first component.

The primary branches 42 develop along a first equator of the surface 32, while the secondary branches 44 develop along a second equator, the two equators preferably lying on planes which are parallel and substantially orthogonal to the W axis (see FIG. 6).

The primary branches 42 and the secondary branches 44 are joined by channel sections 46 which are parallel to the W axis.

The inlets 34 connect with the terminal sections 38 via initial sections 48, which may be straight or curved.

The component 30 may have a different number of inlets 34 and terminal sections 38, e.g. six. In this case the arrangement of the introduction directions Z would be as in FIG. 3. FIG. 4 instead shows a variant with three inlets 34 and three terminal sections 38.

The molten material from the supply channel 22 arrives in the receiving area 40, branches off in the two primary branches 42, travels along the two secondary branches 44, reaches the inlets 34, continues in the initial sections 48, arrives in the terminal sections 38 and finally exits in the central cavity 33.

Figure 5:
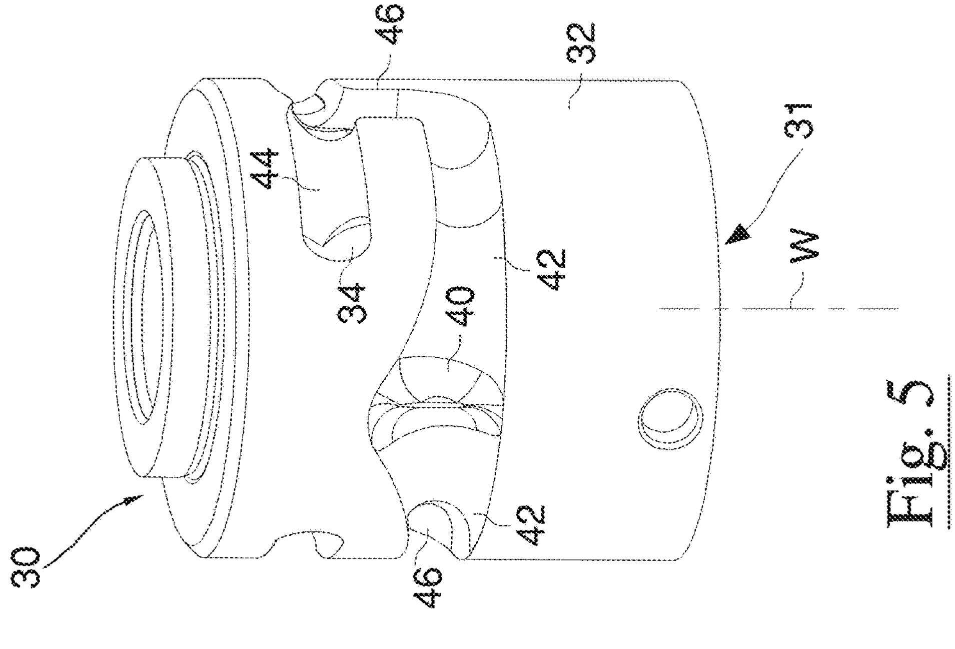
FIG. 5 shows a three-dimensional view of a first component.
Figure 9:
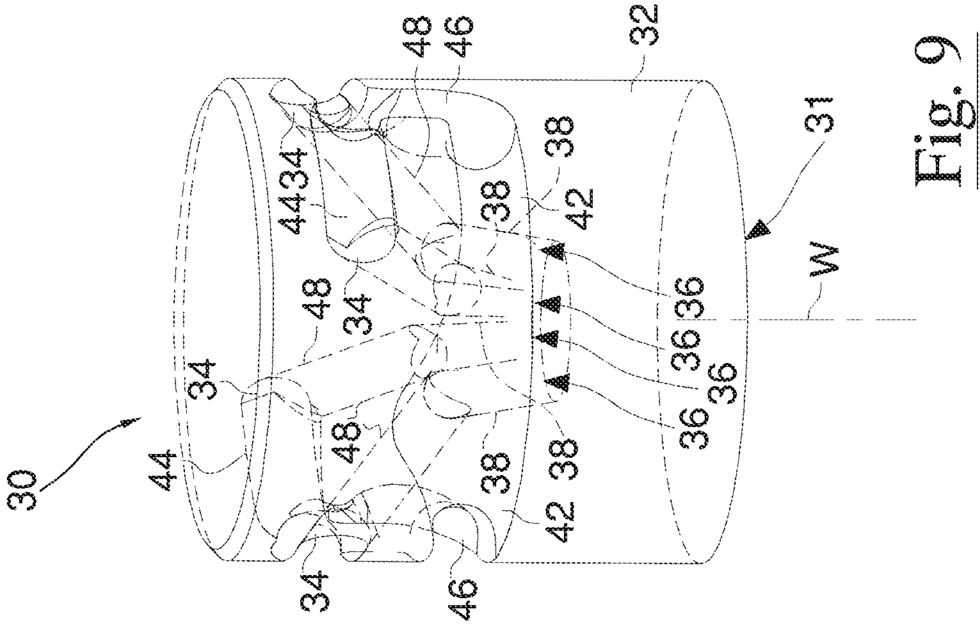
FIG. 9 shows a simplified three-dimensional view of the first component with internal parts.
Figure 8:
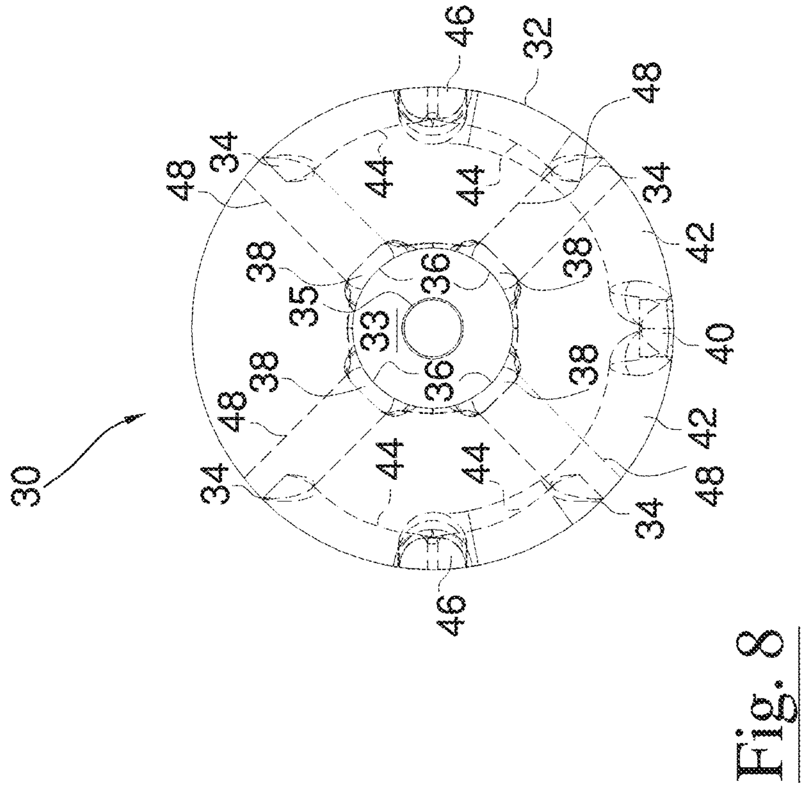
FIG. 8 shows a view from above of the first component.
Figure 12:
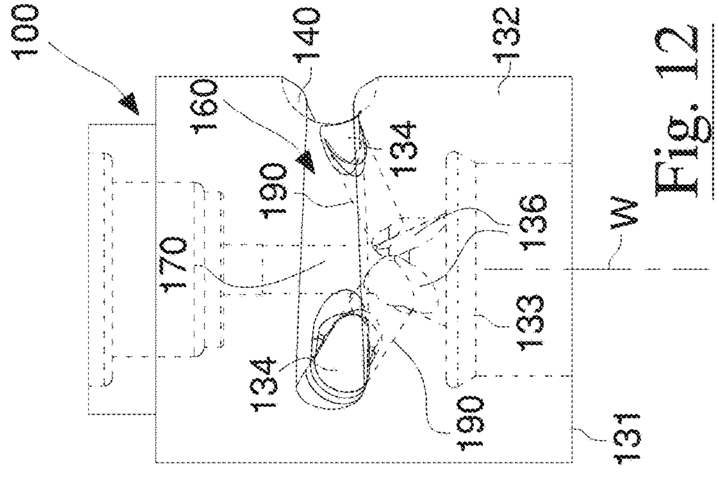
FIG. 12 shows a side view of the second component with internal parts shown with hatching.
Figure 11:
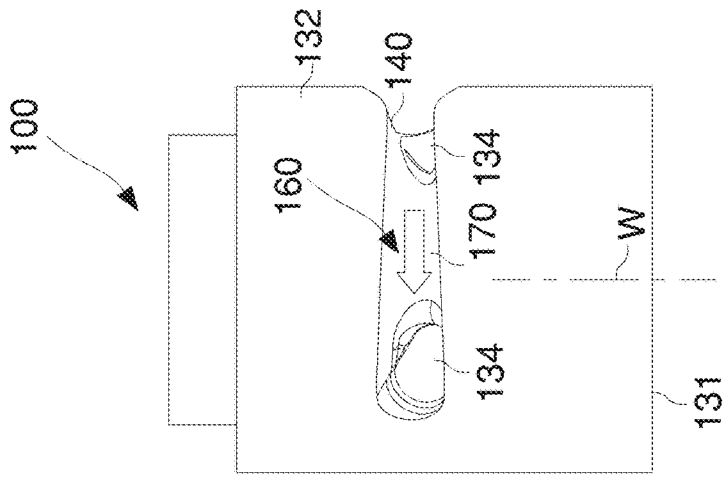
FIG. 11 shows a side view of the second component.
Figure 10:
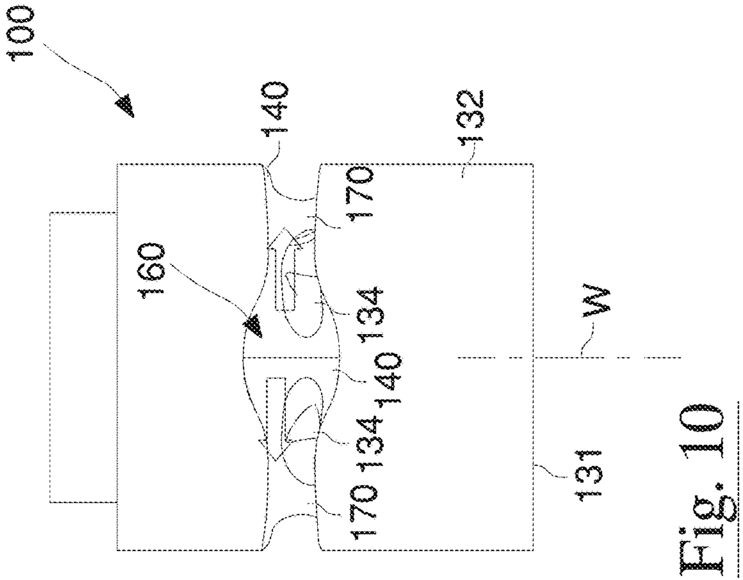
FIG. 10 shows a front view of a second component.
Figure 14:
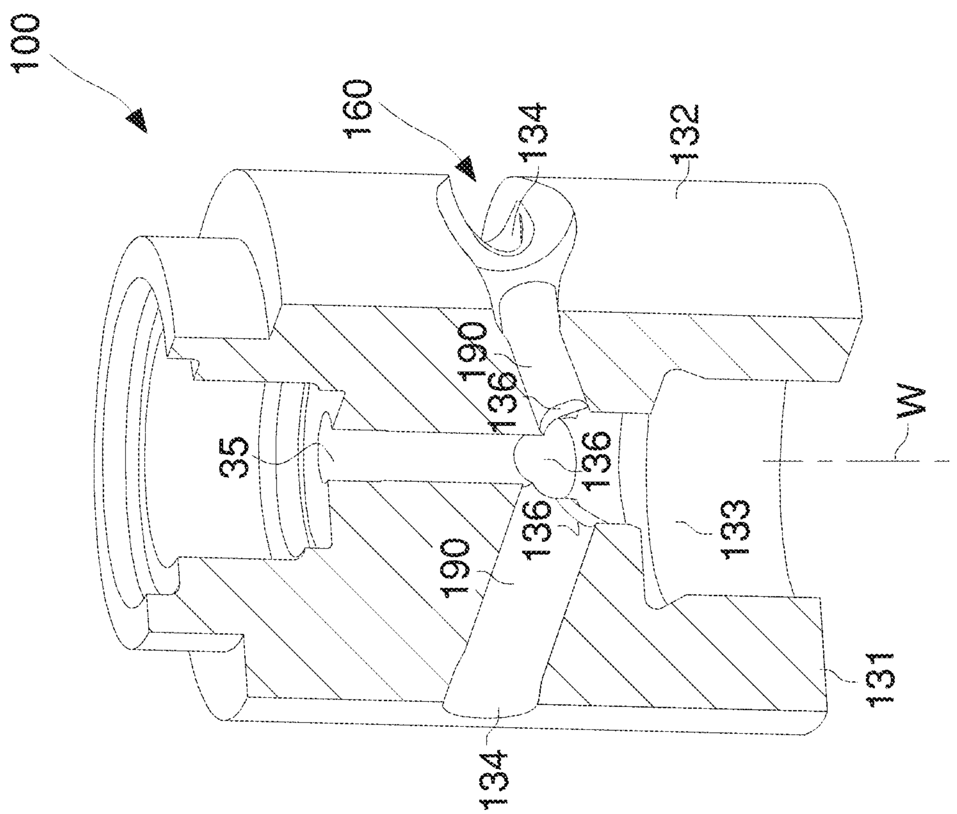
FIG. 14 shows a cutaway view of the second component.
Figure 13:
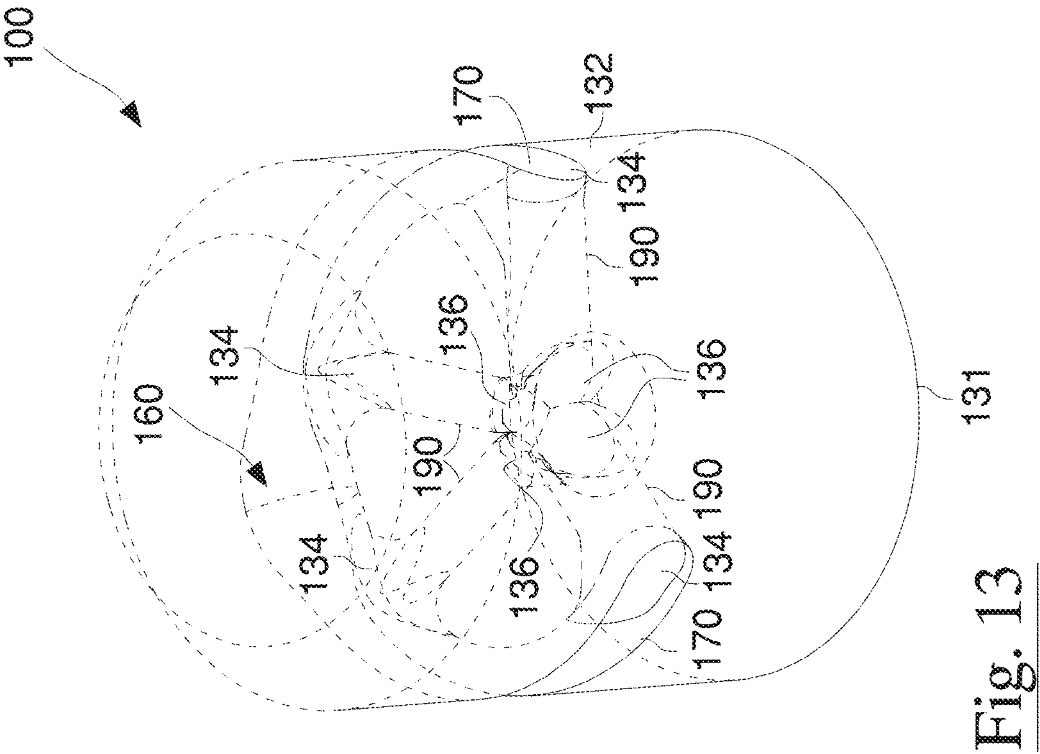
FIG. 13 shows a simplified three-dimensional view of the second component with internal parts.

In FIG. 5 it can be seen how the cross-section of the groove at the receiving area 40 is wider than the cross-section of the grooves 42 and 44. This arrangement, which can be exploited independently in each variant of component, allows the speed of the molten material flowing inside the inner grooves and channels to be increased.

A second embodiment of the component is the component 100 of FIGS. 10-14, which has a substantially cylindrical shape (but not necessarily), has a W axis (preferably coinciding with the Y axis) and an external lateral surface 132.

The component 100 has a base 131 having a central cavity 133 which communicates fluidly with the injection channel 24.

In the surface 132 for the molten material there are formed four inlets 134, which continue inside the component 100 with inner channels, functionally analogous to those of the component 30, with a respective outlet 136 which flows into a central cavity 133.

The component 100 differs from the component 30 by the topology of the feeding grooves and the path of the inner channels.

Each inner channel from the inlet 134 reaches its outlet 136 only with one portion of straight channel 190 extending along an introduction direction Z. The Z directions are arranged like the edges of an imaginary straight regular pyramid with a square base, as for the component 30.

The component 100 comprises a single equatorial surface groove 160 which develops with two symmetrical branches 170 from a single front receiving zone 140 (a portion of the groove 160) for the molten material arriving from the supply channel 22. On opposite sides of the receiving zone 140 there are obtained two of the inlets 134; the other two inlets 134 are located at the end of the branches 170, in opposite positions to each other.

All inlets 134 are located substantially along an equator of the surface 132; and this solution may be implemented independently in a component according to the invention.

In this variant, however, the cross-sections of the channels 190 are not all equal, but vary according to the position of the channel 190. In particular, the two channels furthest from the receiving area 140 have a larger cross-section, to compensate for the load losses of a longer path. This solution may be implemented independently in a component according to the invention.

The component 100 may have:

a different number of inlets 34 and channels 190, like the component 30; and/or Z directions arranged like the edges of an imaginary right regular pyramid with a rectangular base; and/or cross-sections of the channels 190 and the outlets 136 being circular or elliptical or oval.

Figure 17:
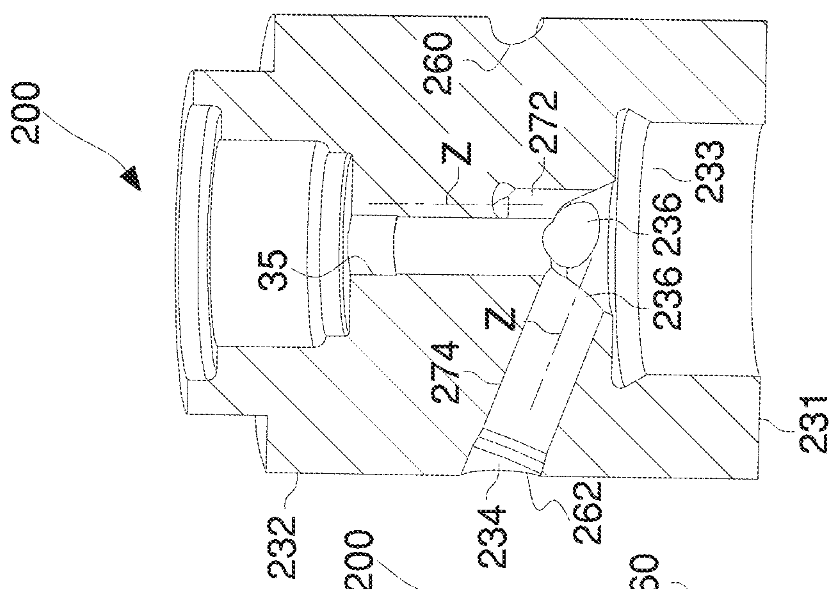
FIG. 17 shows a cutaway view of the third component.
Figure 16:
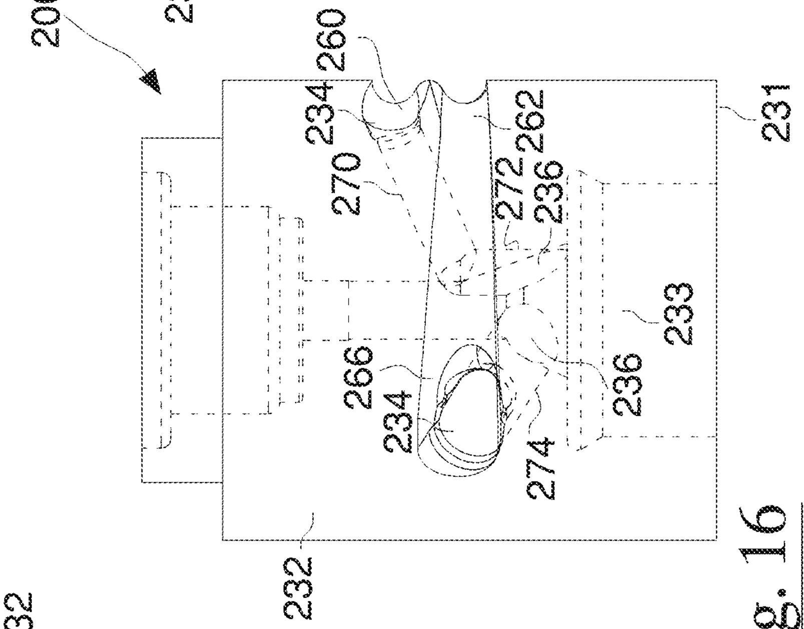
FIG. 16 shows a side view of the third component.
Figure 15:
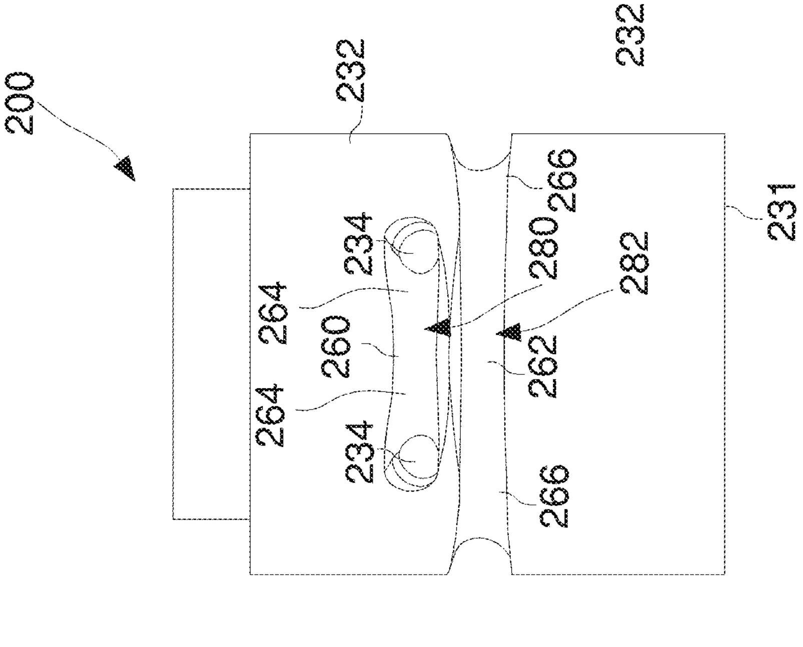
FIG. 15 shows a front view of a third component.

A third embodiment of the component is the component 200 of FIGS. 15-17, which has a substantially cylindrical shape (but not necessarily), W axis coinciding with the Y axis and an external lateral surface 232.

The component 200 has a base 231 having a central cavity 233 which communicates fluidly with the injection channel 24.

In the surface 232 for the molten material there are obtained four inlets 234 of inner channels, which continue inside the component 200 with inner channels provided with a respective outlet 236 which flows into the central cavity 233.

The component 200 differs from the component 30 by the topology of the supply grooves and the path of the inner channels.

The component 200 comprises two disjoint equatorial surface grooves 260, 262. The groove 260 develops with two symmetrical branches 264 from a front receiving zone 280 (a portion of the groove 260) for the molten material arriving from the supply channel 22. On opposite sides of the receiving zone 280, at the end of the groove 260, two of the inlets 234 are obtained.

The groove 260 is the shorter of the two and develops along an arc. On such arc there insists an angle of approximately 60-90° which has its vertex on the W, Y axis.

The groove 262 develops with two symmetrical branches 266 from a front receiving zone 282 (a portion of the groove 262) for the molten material arriving from the supply channel 22. The other two inlets 234 are obtained on opposite sides of the receiving zone 282. The groove 262 is the longer of the two and develops along an arc. On such arc there insists an angle of approximately 120-150° which has its vertex on the W, Y axis.

Each inner channel from the inlet 234 of the groove 260 reaches its outlet 236 through the series of a first straight channel 270 and a second straight channel 272 joined to the first to form an elbow deviation towards the central cavity 233.

Each inner channel from the inlet 234 of the groove 262 reaches its outlet 236 only via a straight channel 274. In a variant, each inlet 234 of the groove 262 might reach its outlet 236 via the series of two straight channels.

To compensate and balance the different load losses along the different paths, preferably the channels 270, 272, which are closer to the respective receiving area, have a smaller cross-section than that of the channel 274. The solution of having different cross-sections for the various inner channels and for the grooves may be implemented in independent manner in a component according to the invention.

For the same reason, preferably the length of the channel 274 is less than the total length of the channels 270, 272. The solution of having inner channels with different lengths may be implemented in independent manner in a component according to the invention.

In the component 200 the introduction directions Z are arranged like the edges of an imaginary pyramid with a square base, but the angles α are two by two different (or the pyramid is not right).

In fact, note that the channels 274, 272 have introduction direction Z with different angles α (FIG. 17). Even the solution of having inner channels with different α angles may be implemented in independent manner in a component according to the invention.

The invention claimed is:

1. A component, of an injection molding apparatus, configured to be mounted within a manifold for molten material as a junction between a supply channel, which has a first axis, and an injection channel, which has a second axis and leads to an injection nozzle for injection towards a mold cavity, wherein a nozzle shutter crosses the feed channel and the component along the second axis, the supply channel and the injection channel are made inside the manifold of the apparatus, the first axis and the second axis are substantially incident and form a direction change angle for the molten material, the component comprising:

an outer surface comprising inlets adapted to receive the molten material arriving from the supply channel, a central cavity which is in fluid communication with the injection channel to send the molten material there, internal channels which cross a thickness of the component, are adapted to put said inlets in communication with P outlets in the central cavity through P terminal sections, P>=3, and have a terminal section;

wherein the terminal section of each internal channel in proximity of the respective outlet develops so as to introduce the molten material into the central cavity according to an introduction direction directed towards the injection channel, wherein introduction directions of the P terminal sections:

are contained in a reference plane passing through a third axis parallel to the second axis, are arranged circularly around the third axis, and form an introduction angle 0<α<90° with respect to a plane orthogonal to the third axis;

such that flow of the molten material in the supply channel is divided by the component into sub-flows for each channel, the sub-flows being diverted by the component towards the injection channel and upon exiting the injection channel recompose an initial flow.

2. The component according to claim 1, wherein the reference planes containing the introduction direction all pass through the third axis.

3. The component according to claim 1, wherein between one reference plane and a next reference plane there is an angular pitch β equal and constant for all pairs of reference planes.

4. The component according to claim 2, wherein between one reference plane and a next reference plane there is an angular pitch β equal and constant for all pairs of reference planes.

5. The component according to claim 1, wherein the introduction directions are arranged as edges of an imaginary right pyramid having
   - base polygon with as many sides as the P terminal sections,
   - vertex set on the third axis and facing the central cavity, and
   - altitude coinciding with the third axis.

6. The component according to claim 2, wherein the introduction directions are arranged as edges of an imaginary right pyramid having
   - base polygon with as many sides as the P terminal sections,
   - vertex set on the third axis and facing the central cavity, and
   - altitude coinciding with the third axis.

7. The component according to claim 3, wherein the introduction directions are arranged as edges of an imaginary right pyramid having
   - base polygon with as many sides as the P terminal sections,
   - vertex set on the third axis and facing the central cavity, and
   - altitude coinciding with the third axis.

8. The component according to claim 5, wherein the introduction directions are arranged as the edges of an imaginary right pyramid having
   - base polygon with as many sides as the P terminal sections,
   - vertex set on the third axis and facing the central cavity, and
   - altitude coinciding with the third axis.

9. The component according to claim 1, comprising P internal channels configured to connect each inlet only through one respective terminal section.

10. The component according to claim 5, comprising P internal channels configured to connect each inlet only through one respective terminal section.

11. The component according to claim 1, comprising
   - R inlets on the outer surface, R>=2,
   - R channel sections, where each of the R channel sections originates respectively from one of the R inlets, penetrates inside the component, and
   - downstream branches off into Q terminal channel sections;
   - where Q>=2 and R*Q=P.

12. The component according to claim 5, comprising
   - R inlets on the outer surface, R>=2,
   - R channel sections, where each of the R channel sections originates respectively from one of the R inlets, penetrates inside the component, and
   - downstream branches off into Q terminal channel sections;
   - where Q>=2 and R*Q=P.

13. The component according to claim 6, comprising
   - R inlets on the outer surface, R>=2,
   - R channel sections, where each of the R channel sections originates respectively from one of the R inlets, penetrates inside the component, and
   - downstream branches off into Q terminal channel sections;
   - where Q>=2 and R*Q=P.

14. The component according to claim 11, wherein Q=2 so that the component comprises R inlets on the outer surface, each input leading to a channel section which branches off into two terminal sections, and P=2*R.

15. The component according to claim 12, wherein Q=2 so that the component comprises R inlets on the outer surface, each input leading to a channel section which branches off into two terminal sections, and P=2*R.

16. The component according to claim 13, wherein Q=2, so that the component comprises R inlets on the outer surface, each input leading to a channel section which branches off into two terminal sections, and P=2*R.

17. The component according to claim 1, comprising on said outer surface one grooves configured to convey molten material to at least one of said inlets, wherein said groove divides into at least two branches configured to convey the molten material in different directions from a point of the groove common to the branches towards at least two of said inlets.

18. The component according to claim 17, wherein said groove divides into at least two branches configured to convey molten material in different, opposite directions, from a point of the groove common to the branches towards at least two of said inlets.

19. The component according to claim 17, wherein said branches of said groove extend along two arcs substantially contained in a plane orthogonal to the third axis.

20. The component according to claim 18, wherein said branches of said groove extend along two arcs substantially contained in a plane orthogonal to the third axis.

* * * * *